US012255838B2

(12) United States Patent
Alabbasi et al.

(10) Patent No.: US 12,255,838 B2
(45) Date of Patent: Mar. 18, 2025

(54) TECHNIQUE FOR DETERMINING SEGMENTATION PARAMETERS FOR USE IN SEGMENTING RLC PDUS

(71) Applicant: Telefonaktiebolaget LM Ericsson (publ)

(72) Inventors: Abdulrahman Alabbasi, Kista (SE); Vijaya Yajnanarayana, Bangalore (IN); Alexandros Palaios, Moers (DE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 436 days.

(21) Appl. No.: 17/792,544

(22) PCT Filed: Feb. 4, 2020

(86) PCT No.: PCT/EP2020/052753
§ 371 (c)(1),
(2) Date: Jul. 13, 2022

(87) PCT Pub. No.: WO2021/155911
PCT Pub. Date: Aug. 12, 2021

(65) Prior Publication Data
US 2023/0128069 A1  Apr. 27, 2023

(51) Int. Cl.
*H04W 4/00* (2018.01)
*H04L 5/00* (2006.01)
*H04W 72/542* (2023.01)

(52) U.S. Cl.
CPC .......... *H04L 5/0044* (2013.01); *H04L 5/0035* (2013.01); *H04W 72/542* (2023.01)

(58) Field of Classification Search
CPC ...... H04W 72/542; H04L 5/00; H04L 5/0044; H04L 5/0035; H04L 1/0003; H04L 1/0035
(Continued)

(56) References Cited

U.S. PATENT DOCUMENTS 9,474,064 B2    10/2016   Sayeed et al.
10,615,897 B2 *  4/2020   Islam ................ H04W 56/0035
(Continued)

FOREIGN PATENT DOCUMENTS

EP      3537776 A1      9/2019
WO      2007091965 A2   8/2007
WO      2016078723 A1   5/2016

OTHER PUBLICATIONS

3rd Generation Partnership Project, "3rd Generation Partnership Project; Technical Specification Group Radio Access Network; NR; User Equipment (UE) radio access capabilities (Release 16)", Technical Specification, 3GPP TS 38.306 V16.8.0, Mar. 1, 2022, pp. 1-156, 3GPP.
(Continued)

*Primary Examiner* — Marceau Milord
(74) *Attorney, Agent, or Firm* — COATS & BENNETT, PLLC

(57) ABSTRACT

A technique for determining segmentation parameters for use in segmenting Radio Link Control, RLC, Protocol Data Units, PDUs, in an RLC preprocessing procedure performed by a User Equipment, UE, prior to receiving an Uplink, UL, grant for transmission of the RLC PDUs is disclosed, wherein the segmentation parameters comprise a size of RLC PDU segments and a number of RLC PDU segments to be included into a physical layer Transport Block, TB. A method implementation of the technique comprises determining (S302) a TBS prediction of an expected physical layer Transport Block Size, TBS, determining (S304) an observation prediction of at least one of an expected channel quality, an expected traffic volume and an expected available bandwidth observable during transmission of the RLC PDUs, and determining (S306) the size of RLC PDU segments and the number of RLC PDU segments based on the TBS prediction and the observation prediction, wherein the
(Continued)

size of RLC PDU segments and the number of RLC PDU segments are determined to maximize the size of RLC PDU segments while keeping a total size of the number of RLC PDU segments within the expected TBS.

20 Claims, 6 Drawing Sheets

(58) Field of Classification Search
USPC .......................................................... 370/329
See application file for complete search history.

(56) References Cited

U.S. PATENT DOCUMENTS

| | | | |
|---|---|---|---|
| 2009/0086709 A1* | 4/2009 | Pani | H04L 47/365 |
| | | | 370/349 |
| 2016/0219563 A1* | 7/2016 | Sayeed | H04L 1/0007 |
| 2019/0149365 A1* | 5/2019 | Chatterjee | H04L 25/0226 |
| | | | 370/329 |
| 2019/0272481 A1* | 9/2019 | Price | H04N 23/61 |
| 2020/0100235 A1* | 3/2020 | Jo | H04W 80/02 |
| 2020/0119884 A1* | 4/2020 | Jiang | H04L 27/0006 |
| 2020/0120684 A1* | 4/2020 | Wu | H04L 5/0046 |
| 2020/0195650 A1* | 6/2020 | Kurup | H04L 63/102 |
| 2020/0236716 A1* | 7/2020 | Lei | H04W 52/00 |
| 2020/0245372 A1* | 7/2020 | Lei | H04W 72/23 |
| 2020/0281006 A1* | 9/2020 | Kumar | H04W 72/02 |
| 2020/0389876 A1* | 12/2020 | Islam | H04L 5/0094 |
| 2021/0029678 A1* | 1/2021 | Liu | H04L 5/0044 |
| 2021/0051645 A1* | 2/2021 | Manolakos | H04W 72/0446 |
| 2021/0105054 A1* | 4/2021 | Gulati | H04B 7/0639 |
| 2021/0105166 A1* | 4/2021 | Khoshnevisan | H04W 8/24 |
| 2021/0105844 A1* | 4/2021 | Joseph | H04W 80/08 |
| 2021/0112541 A1* | 4/2021 | Manolakos | H04W 72/0453 |
| 2021/0127368 A1* | 4/2021 | Abedini | H04B 7/15528 |
| 2021/0160901 A1* | 5/2021 | Takeda | H04W 72/21 |

OTHER PUBLICATIONS

Ferrus, R. et al., "Applicability Domains of Machine Learning in Next Generation Radio Access Networks", 2019 International Conference on Computational Science and Computational Intelligence (CSCI), Dec. 5, 2019, pp. 1-8, IEEE.

Industrial Technology Research Institute, "3GPP NR U-Plane Introduction", Jan. 1, 2017, pp. 1-26, retrieved on Jul. 5, 2022, retrieved from internet: https://std-share.itri.org.tw/Content/Files/Event/Files/3.3GPP%20NR%20U-plane%20introduction_CCY.pdf.

* cited by examiner

S602 — Train a machine learning agent using a training data set comprising TBS data and observation data as input data and corresponding sizes of RLC PDU segments and corresponding numbers of RLC PDU segments as output data, wherein the training data set is selected so as to maximize, when the machine learning agent determines a size of RLC PDU segments and a number of RLC PDU segments based on a TBS prediction of an expected physical layer TBS and an observation prediction of at least one of an expected channel quality, an expected traffic volume and an expected available bandwidth observable during transmission of RLC PDUs, the size of RLC PDU segments while keeping a total size of the number of RLC PDU segments within the expected TBS

Fig. 6

TECHNIQUE FOR DETERMINING SEGMENTATION PARAMETERS FOR USE IN SEGMENTING RLC PDUS

TECHNICAL FIELD

The present disclosure generally relates to mobile communication systems. In particular, a technique for determining segmentation parameters for use in segmenting Radio Link Control (RLC) Protocol Data Units (PDUs) in an RLC preprocessing procedure performed by a User Equipment (UE) prior to receiving an Uplink (UL) grant for transmission of the RLC PDUs is provided. The technique may be embodied in methods, computer programs, apparatuses and systems.

BACKGROUND

In 4G mobile communication systems, such as Long Term Evolution (LTE) systems, the generation of PDUs on the RLC layer of the mobile communication protocol stack may involve concatenation and segmentation procedures allowing to combine several Service Data Units (SDUs) of the RLC layer into a single RLC PDU or to subdivide a single RLC SDU into several RLC PDUs, respectively. FIG. 1 shows a typical protocol stack of an LTE system in which Internet Protocol (IP) packets to be transmitted are passed from the IP layer to the Packet Data Convergence Protocol (PDCP) layer for header compression and ciphering purposes, resulting in PDCP SDUs which are then passed from the PDCP layer to the RLC layer, resulting in the above-mentioned RLC SDUs. As indicated in FIG. 1, RLC SDUs may be concatenated or segmented on the RLC layer in order to generate corresponding RLC PDUs which are then passed to the Medium Access Control (MAC) layer, resulting in MAC SDUs. One or more MAC SDUs may then be filled into a Transport Block (TB) of the physical (PHY) layer for the actual transmission to a receiver.

When a UE is about to transmit Uplink (UL) data on a Data Radio Bearer (DRB) established between the UE an evolved NodeB (eNB) in an LTE system, the UE generates RLC PDUs after receipt of an UL grant from the eNB in order to be able to concatenate and/or segment the right amount of data into the physical layer TBs. The requirement of waiting for the UL grant before starting to generate the RLC PDUs/MAC SDUs may introduce considerable delay, however, which may not be suitable for latency-critical services of new 5G mobile communication systems, such as Ultra-Reliable Low-Latency Communication (URLLC) services, for example. 5G mobile communication systems, also known as New Radio (NR) systems, generally attempt to alleviate the latency issue by removing the possibility of performing RLC SDU concatenation and by enabling construction of RLC PDUs without the need of receiving the UL grant. This procedure is known as "RLC preprocessing" in 5G communications systems.

However, although RLC preprocessing may reduce latency in preparing RLC PDUs/MAC SDUs by the removal of the RLC concatenation, it may increase the overhead of the RLC and upper layers as well as decrease the spectral efficiency because—due to the missing concatenation of small RLC SDUs—physical layer TBs may not always be fully filled. One way of addressing this problem may involve increasing the segment size of RLC PDUs, but this generally comes at the risk that the size of RLC PDU segments may be larger than the available Transport Block Size (TBS), resulting in fragmentation of RLC PDUs on the physical layer.

SUMMARY

Accordingly, there is a need for a technique for determining suitably sized RLC PDUs that increase spectral efficiency while maintaining the decreased latency resulting from RLC preprocessing.

According to a first aspect, a method for determining segmentation parameters for use in segmenting RLC PDUs in an RLC preprocessing procedure performed by a UE prior to receiving a UL grant for transmission of the RLC PDUs is provided, wherein the segmentation parameters comprise a size of RLC PDU segments and a number of RLC PDU segments to be included into a physical layer TB. The method comprises determining a TBS prediction of an expected physical layer TBS, determining an observation prediction of at least one of an expected channel quality, an expected traffic volume and an expected available bandwidth observable during transmission of the RLC PDUs, and determining the size of RLC PDU segments and the number of RLC PDU segments based on the TBS prediction and the observation prediction, wherein the size of RLC PDU segments and the number of RLC PDU segments are determined to maximize the size of RLC PDU segments while keeping a total size of the number of RLC PDU segments within the expected TBS.

Determining the size of RLC PDU segments and the number of RLC PDU segments may be performed using a static allocation algorithm. The static allocation algorithm may be adapted to maximize a weighted sum of a payload to overhead ratio regarding RLC PDU segments and a number of RLC PDU segments. Determining the size of RLC PDU segments and the number of RLC PDU segments may also be performed using a machine learning agent which may be trained using a training data set comprising TBS data and observation data as input data and corresponding sizes of RLC PDU segments and corresponding numbers of RLC PDU segments as output data. Determining the size of RLC PDU segments and the number of RLC PDU segments may also be performed using a reinforcement learning agent, wherein a state of an environment may be defined by the TBS prediction and the observation prediction, and wherein an action taken by the reinforcement learning agent from a given state may correspond to an allocation of a number of RLC PDU segments with a particular size. An amount of a positive reward attributed to an action taken by the reinforcement learning agent from a given state may be calculated in accordance with the size of the allocated RLC PDU segments, provided that a total size of the allocated number of RLC PDU segments is within the expected TBS. A negative reward may be attributed to an action taken by the reinforcement learning agent from a given state when a total size of the allocated number of RLC PDU segments exceeds the expected TBS. The reinforcement learning agent may be a deep reinforcement learning agent for which values for a given state-action pair are determined using a deep neural network.

The method may further comprise determining an interference prediction of an expected interference caused by at least one of other cells and other UEs, wherein the TBS prediction may be determined based on the interference prediction. At least one of the TBS prediction and the interference prediction may be determined based on the observation prediction. At least one of the TBS prediction, the interference prediction and the observation prediction may be determined using a machine learning agent or a statistical prediction agent. At least one of the TBS prediction, the interference prediction and the observation prediction may be determined based on input data comprising at least one of application traffic related data, UE related data, protocol layer related data, radio transmission related data, and environment related data. The application traffic related data may comprise data regarding at least one of packet sizes, uplink/downlink packet numbers, inter packet arrival times, times since last packets, and application protocols. The UE related data may comprise data regarding at least one of UE capabilities, UE device types, UE manufacturers, and UE 3GPP feature types. The protocol layer related data may comprise data regarding at least one of Logical Channel Identities (LCH-IDs), Buffer Status Reports (BSRs), and TBSs. The radio transmission related data may comprise data regarding at least one of Channel State Information (CSI), Physical Resource Blocks (PRBs), and Modulation and Coding Schemes (MCSs). The environment related data may comprise data regarding at least one of weather conditions, and architectural information regarding a building.

The expected channel quality may be indicated by CSI. The expected traffic volume may correspond to traffic volume on a DRB. A plurality of DRBs may be established, wherein the prediction of the expected traffic volume may be determined per DRB among the plurality of DRBs. The size of RLC PDU segments and the number of RLC PDU segments may be determined per DRB of the plurality of DRBs. The expected available bandwidth may correspond to a bandwidth of PRBs allocated to a UE. A plurality of UEs may be available, wherein the prediction of the expected available bandwidth may be determined per UE among the plurality of UEs.

According to a second aspect, a method for training a machine learning agent adapted to determine segmentation parameters for use in segmenting RLC PDUs in an RLC preprocessing procedure performed by a UE prior to receiving a UL grant for transmission of the RLC PDUs is provided, wherein the segmentation parameters comprise a size of RLC PDU segments and a number of RLC PDU segments to be included into a physical layer TB. The method comprises training the machine learning agent using a training data set comprising TBS data and observation data as input data and corresponding sizes of RLC PDU segments and corresponding numbers of RLC PDU segments as output data, the TBS data including physical layer TBSs and the observation data including at least one of channel qualities, traffic volumes and available bandwidths observed in past transmissions of RLC PDUs, wherein the training data set is selected so as to maximize, when the machine learning agent determines the size of RLC PDU segments and the number of RLC PDU segments based on a TBS prediction of an expected physical layer TBS and an observation prediction of at least one of an expected channel quality, an expected traffic volume and an expected available bandwidth observable during transmission of the RLC PDUs, the size of RLC PDU segments while keeping a total size of the number of RLC PDU segments within the expected TBS.

The method according to the second aspect defines a method dedicated to train a machine learning agent which, once it is trained, may be employed for the purpose of determining the size of RLC PDU segments and the number of RLC PDU segments in the method according to the first aspect. The machine learning agent of the second aspect may thus correspond to the machine learning agent described above in relation to the first aspect.

According to a third aspect, a computer program product is provided. The computer program product comprises program code portions for performing the method of at least one of the first aspect and the second aspect when the computer program product is executed on one or more computing devices (e.g., a processor or a distributed set of processors). The computer program product may be stored on a computer readable recording medium, such as a semiconductor memory, DVD, CD-ROM, and so on.

According to a fourth aspect, a computing unit for determining segmentation parameters for use in segmenting RLC PDUs in an RLC preprocessing procedure performed by a UE prior to receiving a UL grant for transmission of the RLC PDUs is provided, wherein the segmentation parameters comprise a size of RLC PDU segments and a number of RLC PDU segments to be included into a physical layer TB. The computing unit comprises at least one processor and at least one memory, wherein the at least one memory contains instructions executable by the at least one processor such that the computing unit is operable to perform any of the method steps presented herein with respect to the first aspect. The computing unit may be the UE.

According to a fifth aspect, a computing unit for training a machine learning agent adapted to determine segmentation parameters for use in segmenting RLC PDUs in an RLC preprocessing procedure performed by a UE prior to receiving a UL grant for transmission of the RLC PDUs is provided, wherein the segmentation parameters comprise a size of RLC PDU segments and a number of RLC PDU segments to be included into a physical layer TB. The computing unit comprises at least one processor and at least one memory, wherein the at least one memory contains instructions executable by the at least one processor such that the computing unit is operable to perform any of the method steps presented herein with respect to the second aspect.

According to a sixth aspect, there is provided a system comprising a computing unit according to the fourth aspect and, optionally, a computing unit according to the fifth aspect.

BRIEF DESCRIPTION OF THE DRAWINGS

Implementations of the technique presented herein are described herein below with reference to the accompanying drawings, in which:

FIG. 6 illustrates a method which may be performed by the computing unit for training a machine learning agent according to the present disclosure.

DETAILED DESCRIPTION

In the following description, for purposes of explanation and not limitation, specific details are set forth in order to provide a thorough understanding of the present disclosure. It will be apparent to one skilled in the art that the present disclosure may be practiced in other embodiments that depart from these specific details.

Those skilled in the art will further appreciate that the steps, services and functions explained herein below may be implemented using individual hardware circuitry, using software functioning in conjunction with a programmed microprocessor or general purpose computer, using one or more Application Specific Integrated Circuits (ASICs) and/or using one or more Digital Signal Processors (DSPs). It will also be appreciated that when the present disclosure is described in terms of a method, it may also be embodied in one or more processors and one or more memories coupled to the one or more processors, wherein the one or more memories are encoded with one or more programs that perform the steps, services and functions disclosed herein when executed by the one or more processors.

Figure 1:
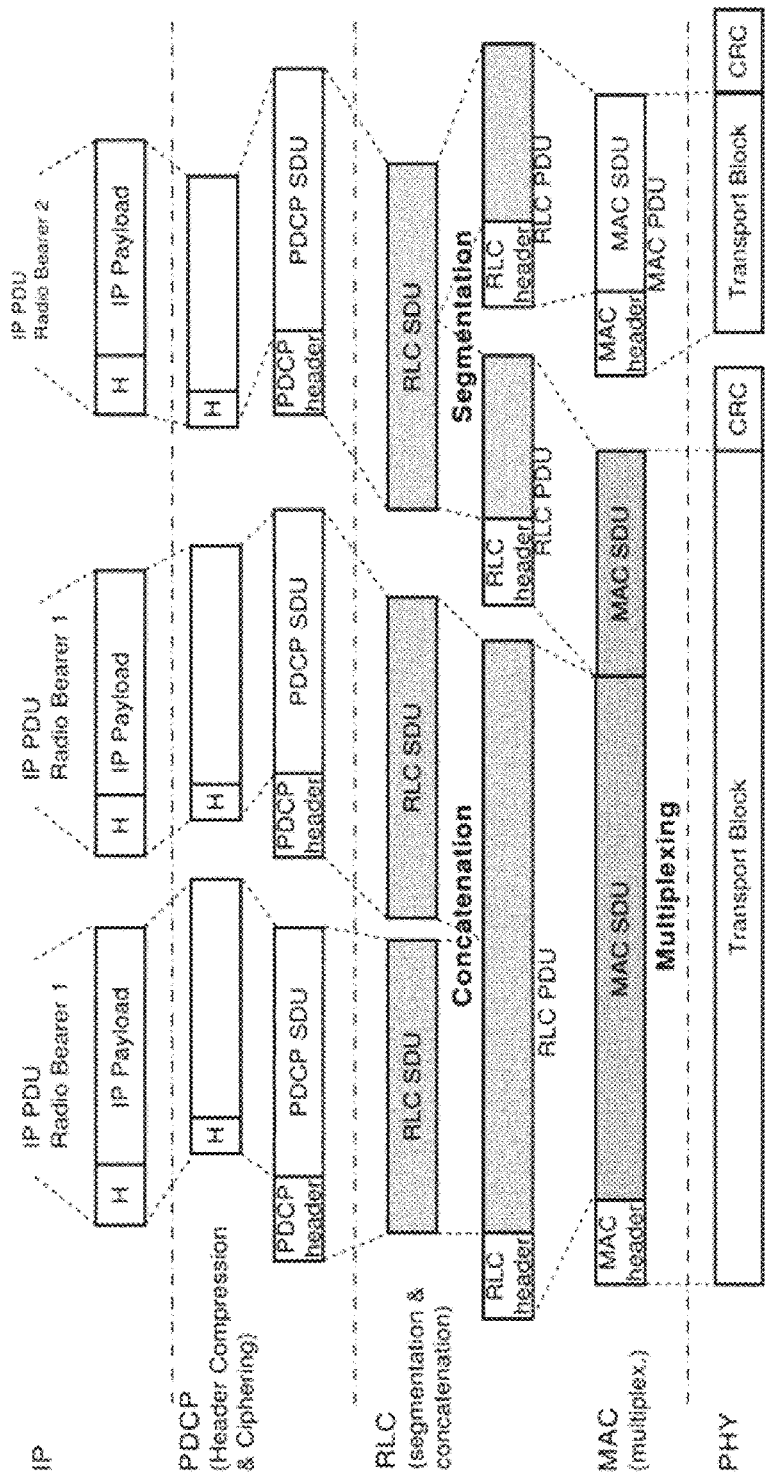
FIG. 1 illustrates an exemplary protocol stack of an LTE system involving concatenation and segmentation of RLC SDUs on the RLC layer.
Figure 2A:
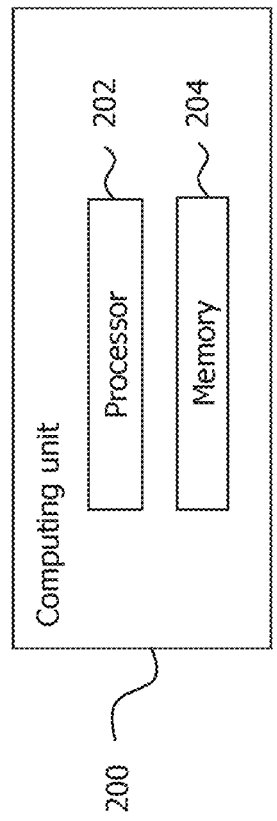
FIGS. 2a and 2b illustrate exemplary compositions of a computing unit for determining segmentation parameters for use in segmenting RLC PDUs and a computing unit for training a machine learning agent according to the present disclosure.

FIG. 2a schematically illustrates an exemplary composition of a computing unit 200 for determining segmentation parameters for use in segmenting RLC PDUs in an RLC preprocessing procedure performed by a UE prior to receiving a UL grant for transmission of the RLC PDUs, wherein the segmentation parameters comprise a size of RLC PDU segments and a number of RLC PDU segments to be included into a physical layer TB. The computing unit 200 comprises at least one processor 202 and at least one memory 204, wherein the at least one memory 204 contains instructions executable by the at least one processor 202 such that the computing unit 200 is operable to carry out the method steps described herein below with reference to the computing unit for determining segmentation parameters.

Figure 2B:
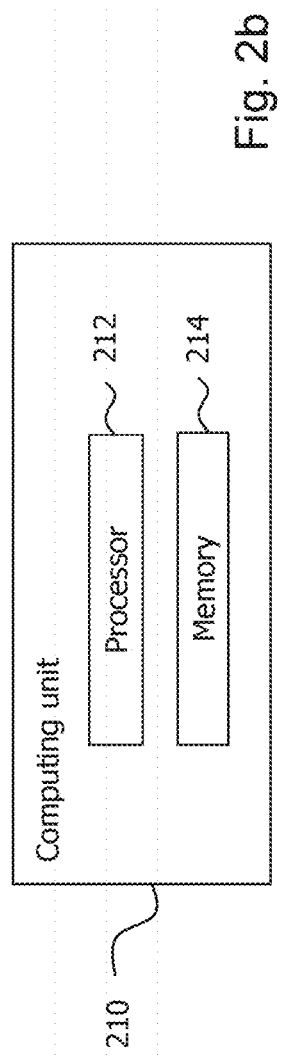

FIG. 2b schematically illustrates an exemplary composition of a computing unit 210 for training a machine learning agent adapted to determine segmentation parameters for use in segmenting RLC PDUs in an RLC preprocessing procedure performed by a UE prior to receiving a UL grant for transmission of the RLC PDUs, wherein the segmentation parameters comprise a size of RLC PDU segments and a number of RLC PDU segments to be included into a physical layer TB. The computing unit 210 comprises at least one processor 212 and at least one memory 214, wherein the at least one memory 214 contains instructions executable by the at least one processor 212 such that the computing unit 210 is operable to carry out the method steps described herein below with reference to the computing unit for training a machine learning agent.

Figure 3:
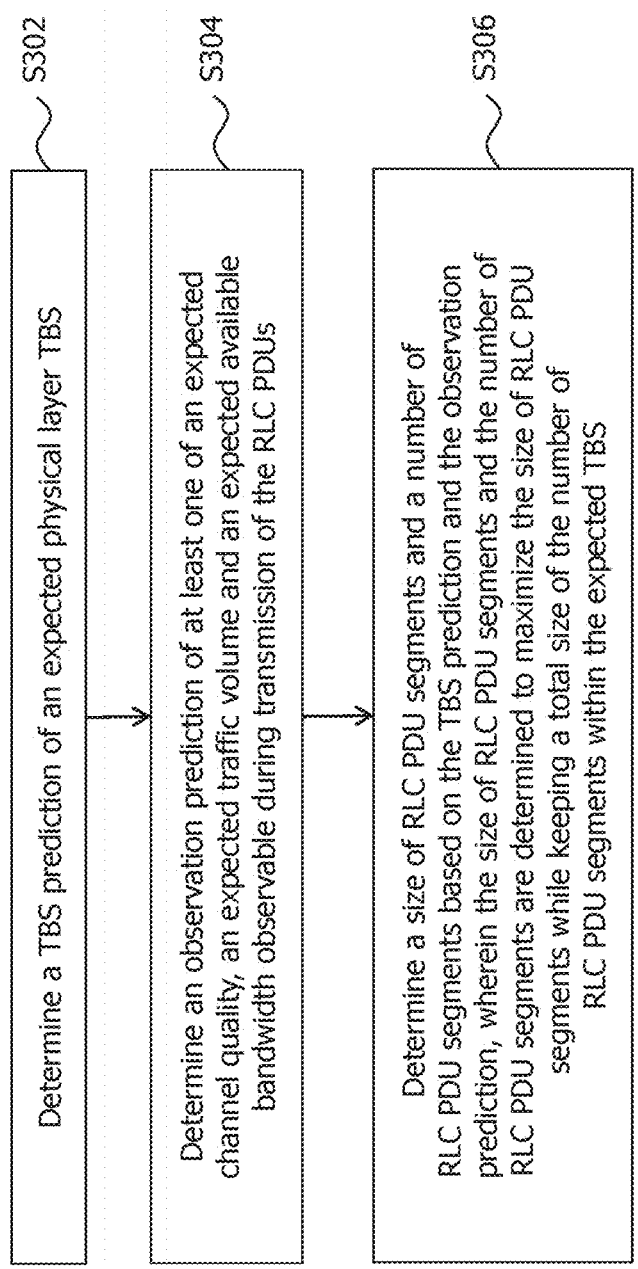
FIG. 3 illustrates a method which may be performed by the computing unit for determining segmentation parameters according to the present disclosure.

FIG. 3 illustrates a method which may be performed by the computing unit 200 according to the present disclosure. The method is dedicated to determining segmentation parameters for use in segmenting RLC PDUs in an RLC preprocessing procedure performed by a UE prior to receiving a UL grant for transmission of the RLC PDUs, the segmentation parameters comprising a size of RLC PDU segments and a number of RLC PDU segments to be included into a physical layer TB. In step S302, the computing unit 200 may determine a TBS prediction of an expected physical layer TBS. In step S304, the computing unit 200 may determine an observation prediction of at least one of an expected channel quality, an expected traffic volume and an expected available bandwidth observable during transmission of the RLC PDUs. In step S306, the computing unit 200 may determine the size of RLC PDU segments and the number of RLC PDU segments based on the TBS prediction and the observation prediction, wherein the size of RLC PDU segments and the number of RLC PDU segments are determined to maximize the size of RLC PDU segments while keeping a total size of the number of RLC PDU segments within the expected TBS.

The RLC preprocessing procedure may correspond to an RLC preprocessing procedure described above in relation to known mobile communication systems, i.e., to a procedure in which, during the processing of RLC SDUs on the RLC layer to generate corresponding RLC PDUs, a concatenation of RLC SDUs may not be performed and in which the UE may not wait until receipt of a UL grant for transmission of the RLC PDUs in order to start processing the RLC SDUs. The UE may in other words start processing the RLC SDUs on the RLC layer without prior receipt of a UL grant for transmission of the RLC PDUs. A segmentation of RLC SDUs may still be performed on the RLC layer, however, i.e., by subdividing (or "segmenting") the RLC SDUs so that a plurality of segmented RLC PDUs may be generated from a respective RLC SDU. The resulting RLC PDU segments may then be passed to the MAC layer, resulting in corresponding MAC SDUs on the MAC layer which may be filled into a physical layer TB on the PHY layer, as described above in relation to known systems.

In order to increase spectral efficiency, the RLC PDU segments may be chosen in such a manner that the MAC SDUs corresponding to the resulting RLC PDU segments suitably or optimally fit into the physical layer TBs, so that unused portions (i.e., portions without actual data) in the TBs are reduced (or "minimized") and that, preferably, the TBs are fully filled with actual data. To this end, the expected size of the TBs, i.e., an expected TBS (in expectation of the UL grant to be received), may be determined and, based on the determined expected TBS, appropriate segmentation parameters achieving such suitable/optimized fit may be ascertained, wherein the segmentation parameters may at least comprise a size of RLC PDU segments and a number of RLC PDU segments to be included into a physical layer TB. In particular, the size of RLC PDU segments and the number of RLC PDU segments may be determined so as to maximize the size of RLC PDU segments while keeping a total size of the number of RLC PDU segments within the expected TBS. In this way, it may be possible to increase the RLC PDU size as much as possible and thereby reduce overhead on the RLC and upper layers while maintaining the overall size within the UL grant's TBS to avoid data fragmentation on the physical layer.

According to the technique presented herein, rather than merely considering the expected TBS in determining the suitable size and number of RLC PDU segments to be included into a physical layer TB, such determination may additionally be performed in consideration of at least one of the expected channel quality, the expected traffic volume and the expected available bandwidth (expected to be) observable during transmission of the RLC PDUs. The prediction of the expected TBS may herein also be denoted as the "TBS prediction" and the prediction of the at least one of the expected channel quality, the expected traffic volume and the expected available bandwidth may herein also be denoted as the "observation prediction". The consideration of the observation prediction in addition to the TBS prediction in determining the suitable size and number of RLC PDU segments may generally result in sizes and numbers of RLC PDU segments which improve robustness of transmission efficiency against dynamicity or changes, for example, such as changes in application layer traffic load and intensity, as will be discussed in more detail below.

Determining the size of RLC PDU segments and the number of RLC PDU segments may be performed according to an allocation algorithm which may take the TBS prediction and the observation prediction as input and may produce the suitable/optimized size and number of RLC PDU segments as output. In one variant, the allocation algorithm may be a static allocation algorithm, such as an allocation algorithm which determines the size and number of RLC PDU segments according to a predefined mathematical formula (or "formulation"). Such formulation may be designed to maximize the weighted sum of a ratio of UE payload to overhead and a number of fragmented RLC PDUs, for example. The static allocation algorithm may thus be adapted to maximize a weighted sum of a payload to overhead ratio regarding RLC PDU segments and a number of RLC PDU segments. Exemplary formulations defining objective functions for corresponding optimization problems given an expected TBS may be formulated as follows.

$$\max_{S,Nb} w_0 \left( \frac{P(S, Nb)}{OH(S, Nb)} \right) + w_1 Nb \quad \text{Option 1}$$

$$\max_{S,Nb} w_0 e^{-\left( \frac{OH(S,Nb)}{P(S,Nb)} \right)} + w_1 e^{-\frac{1}{Nb}} \quad \text{Option 2}$$

wherein S corresponds to the size of the RLC PDU segments (e.g., minimum, maximum or mean size), Nb corresponds to the number of RLC PDU segments, OH corresponds to the overhead result of an allocation defined as a function of S and Nb, P corresponds to the payload result of an allocation defined as a function of S and Nb, w0 and w1 correspond to weighting factors (e.g., satisfying w0+w1=1), and e is an exponential function.

Such maximization framework may aggregate data from a logical channel (LCH) into single RLC PDU segments (MAC SDUs), wherein the numbers and sizes of the RLC PDU segments may be equivalent to the expected TBS.

In another variant, the allocation algorithm may be implemented using a machine learning agent which is trained to produce, for a given input comprising TBS data and observation data, an output comprising corresponding sizes and numbers of RLC PDU segments which are optimized or determined to be suitable in the above sense. Determining the size of RLC PDU segments and the number of RLC PDU segments may thus be performed using a machine learning agent which is trained using a training data set comprising TBS data and observation data as input data and corresponding (suitable/optimized) sizes and numbers of RLC PDU segments as output data. The TBS data and the observation data may include data collected in past (actual) RLC PDU transmissions, wherein the TBS data may comprise TBSs used in the past (or "historical") RLC PDU transmissions and the observation data may comprise at least one of channel qualities, traffic volumes and available bandwidths observed during the past RLC PDU transmissions, e.g., together with the TBSs. As the corresponding sizes and numbers of RLC PDU segments are optimized or determined to be suitable in the above sense (e.g., using a static allocation algorithm, as above), the training data set may be said to be selected so as to maximize, when the machine learning agent determines the size of RLC PDU segments and the number of RLC PDU segments based on a TBS prediction and an observation prediction, the size of the RLC PDU segments while keeping a total size of the number of RLC PDU segments within the expected TBS. The machine learning agent may be based on known machine learning models, such as neural networks, for example.

In still another variant, the allocation algorithm may be implemented using a reinforcement learning agent which is configured to determine the suitable/optimized size and number of the RLC PDU segments based on observed environmental states. The reinforcement learning agent may learn a mapping of a TBS prediction and an observation prediction to the size and number of the RLC PDU segments based on an observed long-term behavior of the radio environment.

As known, in reinforcement learning, an agent may observe the environment and adapt itself to the environment with the aim of maximizing a total outcome. The agent may maintain a value for each possible state-action pair in the environment and, for a given state, the agent may choose the next action according to a mapping function, e.g., which chooses the action which provides the highest value in that state. As the agent explores the environment by taking different actions (e.g., through a trial and error process), the values of the state-action pairs may be iteratively updated based on positive or negative rewards attributed to a respective state-action pair depending on whether the action performed was desirable or not in the given state, wherein positive rewards may lead to higher values and negative rewards may lead to lower values for the given state-action pair. An exemplary reinforcement learning agent may be based on Q-learning or similar techniques, for example.

In the present context, reinforcement learning may be modeled in such a manner that a state of the environment is defined by the TBS prediction and the observation prediction and that an action taken by the reinforcement learning agent from a given state corresponds to an allocation of (e.g., the step of allocating) a number of RLC PDU segments with a particular size, wherein the allocated RLC PDU segments are to be filled into a physical layer TB, as described above. Determining the size of RLC PDU segments and the number of RLC PDU segments may thus be performed using a reinforcement learning agent, wherein a state of an environment may be defined by the TBS prediction and the observation prediction and wherein an action taken by the reinforcement learning agent from a given state may correspond to an allocation of a number of RLC PDU segments with a particular size.

An amount of positive reward attributed to an action taken by the reinforcement learning agent from a given state (i.e., to a given state-action pair) may then be calculated in accordance with the size of the allocated RLC PDU segments, provided that a total size of the allocated number of RLC PDU segments is within the expected TBS. In other words, a positive reward may be derived based on how large the size of the allocated RLC PDU segments is and based on considering whether the size of the allocated RLC PDU segments fits into the expected TBS, wherein a larger size of the allocated RLC PDU segments may result in a larger positive reward, so that actions resulting in larger allocations are favored. On the other hand, a negative reward may be attributed to an action taken by the reinforcement learning agent from a given state (i.e., to a given state-action pair) when a total size of the allocated number of RLC PDU segments exceeds the expected TBS. In this way, actions resulting in fragmented RLC PDUs on the physical layer because of too large allocations may be disfavored.

As there may be a huge number of possible state-action pairs, it may not be expedient to store all state-action-pair/value mappings, e.g., in a lookup table, in order to maintain a value for each possible state-action pair. The state-action-pair/value mappings may rather be encoded in a (e.g., deep) neural network which is trained to map state-action pairs to corresponding values. In one implementation, the reinforcement learning agent may thus be a deep reinforcement learning agent for which values for a given state-action pair are determined using a deep neural network. The deep neural network may be used to generalize the mapping also for unknown states of the environment.

As described above, the TBS prediction may be determined as a prediction of an expected physical layer TBS and the observation prediction may be determined as a prediction of at least one of an expected channel quality and an expected traffic volume and an expected available bandwidth observable during transmission of the RLC PDUs. In a refinement, the TBS prediction may additionally be determined based on an interference prediction representing an interference from other cells or UEs. The method may thus further comprise determining an interference prediction of an expected interference caused by at least one of other cells and other UEs, wherein the TBS prediction may be determined based on the interference prediction. In a further refinement, at least one of the TBS prediction and the interference prediction may be determined based on the observation prediction, i.e., at least one of the expected channel quality, the expected traffic volume and the expected available bandwidth of the observation prediction may additionally be taken into consideration when determining the TBS prediction and/or the interference prediction, which may improve robustness of the prediction results against dynamicity or changes in the environment.

All of the predictions mentioned above, i.e., the TBS prediction, the interference prediction and the observation prediction, may be determined using respective subsystems (or "subcomponents") implemented using suitable machine learning agents or statistical prediction agents, for example. At least one of the TBS prediction, the interference prediction and the observation prediction may thus be determined using a machine learning agent or a statistical prediction agent. The data based on which the predictions are determined may be of diverse nature and may include data going beyond mere historical TBS data (which may be used in prior art systems that forecast physical layer TBS) which may improve the accuracy and robustness of the prediction results. In particular, at least one of the TBS prediction, the interference prediction and the observation prediction may be determined based on input data comprising at least one of application traffic related data, UE related data, protocol layer related data, radio transmission related data, and environment related data.

The application traffic related data may comprise data regarding at least one of packet sizes, uplink/downlink packet numbers (e.g., numbers of packets transmitted upward and downward to and from the network, indicating total bytes, for example) inter packet arrival times (e.g., standard deviation, average, etc.), times since last packets, and application protocols (e.g., packet protocols, including Hypertext Transfer Protocol (HTTP), voice, etc.), for example. Such application traffic based data may provide a higher degree of freedom for the agents (i.e., the machine learning agents or statistical prediction agents mentioned above) to learn about the application layer traffic, load, packet size and intensity, including traffic going through PDCP and RLC layers, for example. Such data may assist in taking suitable/optimal decisions when determining the sizes and numbers of RLC PDU segments. In particular, use cases exhibiting dynamic and highly impacted application traffic may be supported with improved robustness, e.g., with respect to transmission efficiency.

The UE related data may comprise data regarding at least one of UE capabilities (e.g., with respect to generated traffic or radio technology support capabilities), UE device types (e.g., smartphones, Internet of Things (IoT) devices, vehicles, etc.), UE manufacturers, and UE 3GPP feature types (e.g., as known from 3GPP TS 38.306, such as 3GPP TS 38.306 v15.8.0 or successor versions thereof), for example. Such UE based features may have an impact on the physical layer technology, the generated traffic from the application layer as well as RLC segmentations. Considering the UE related data may especially improve robustness and performance when devices are changed from training to testing or production, thereby diminishing negative performance effects when the agents are trained on high standard/capability UE devices, but are then tested or used on low quality/capability UE devices, for example.

The protocol layer related data may comprise data regarding at least one of LCH-IDs, BSRs, and TBSs, for example. The radio transmission related data may comprise data regarding at least one of CSI (e.g., historical and current), PRBs (e.g., historical and current), and MCSs (e.g., historical and current), for example. The environment related data may comprise data regarding at least one of weather conditions (e.g., rain/snow situation), and architectural information regarding a building (e.g., building materials of the building where the UE is located, etc.). Such layer based, radio environment based and real-life (actual) environment based inputs may affect physical layer parameters, and considering such data in the determination of suitable/optimized segmentation parameters for improved efficiency or robustness may therefore be expedient as well.

As described above, the observation prediction may be determined as a prediction of at least one of an expected channel quality, an expected traffic volume and an expected available bandwidth expected to be observable during transmission of the RLC PDUs upon receipt of the UL grant. The expected channel quality may be characterized by information indicative of channel conditions. In one variant, the expected channel quality may be indicated by CSI, for example. The expected traffic volume may correspond to an application layer data volume and optionally its characteristics. In one variant, the expected traffic volume may correspond to a traffic volume on a DRB, for example. When a plurality of DRBs is established, the prediction of the expected traffic volume may be determined per DRB among the plurality of DRBs. The size of RLC PDU segments and a number of RLC PDU segments may then be determined per DRB allocated to a UE (e.g., the UE transmitting the RLC PDU segments). The expected available bandwidth may correspond to a bandwidth of PRBs allocated to a UE (e.g., the UE transmitting the RLC PDU segments), for example. When a plurality of UEs is available, the prediction of the expected available bandwidth may be determined per UE among the plurality of UEs.

Figure 4:
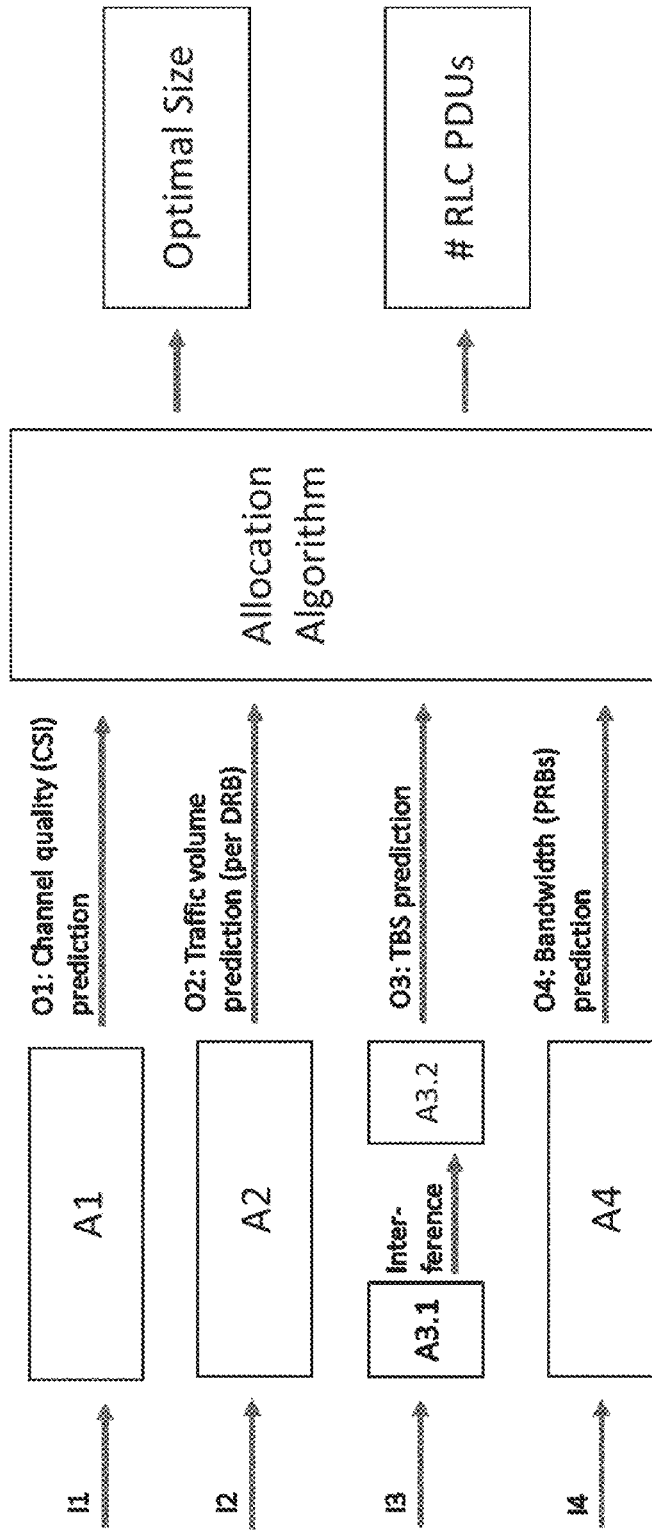
FIG. 4 illustrates an overview of an exemplary system in which segmentation parameters for use in segmenting RLC PDUs are determined according to the present disclosure.

FIG. 4 illustrates an overview of an exemplary system in which a determination of segmentation parameters for use in segmenting RLC PDUs in an RLC preprocessing procedure is performed according to the technique presented herein. The allocation algorithm may be considered as the central part of the system which may take the outputs O1, O2, O3 and O4 of subcomponents A1, A2, A3 (constituted by A3.1 and A3.2) and A4 as input and may determine the suitable/ optimized size and number of RLC PDU segments as output, as described above. Each of the subcomponents A1, A2, A3.1, A3.2 and A4 may be represented by a machine learning agent or a statistical prediction agent. Agent A1 may predict an expected channel quality at a specific future point of time (output O1) based on an input I1, wherein the expected channel quality may be indicated by an expected CSI, for example. Agent A2 may predict an expected traffic volume arrival at a specific future point of time (output O2) based on an input I2, wherein the agent may predict the traffic volume for each service, such as per DRB, for example. Agent A3 may predict the expected TBS at a specific future point of time (output O3) based on an input I3, wherein agent A3 may be constituted by subagents A3.1 and A3.2 among which subagent A3.1 may predict an interference from other cells or users to support identifying the optimal expected TBS, wherein the output of subagent A3.1 may be taken as additional input by subagent A3.2 for determining the expected TBS. Agent A4 may predict an expected available bandwidth at a specific future point of time (output O4) based on an input 14, wherein the expected available bandwidth may be predicted as future allocated PRBs per user, for example. In each of the above cases, the specific point of time may be represented by a specific frame, slot or Orthogonal Frequency Division Multiplexing (OFDM) symbol, for example. The inputs I1, I2, I3 and I4 may be selected from the input data described above, i.e., from application traffic related data, UE related data, protocol layer related data, radio transmission related data and environment related data. The diversity of features in this data may ultimately help to improve the performance of each of the set of subsystems as well as the accuracy, efficiency and robustness of the entire system. In a variant, at least one of subagents A3.1 and A3.2 may additionally take into consideration at least one of outputs O1, O2 and O4 when determining the TBS prediction.

Figure 5:
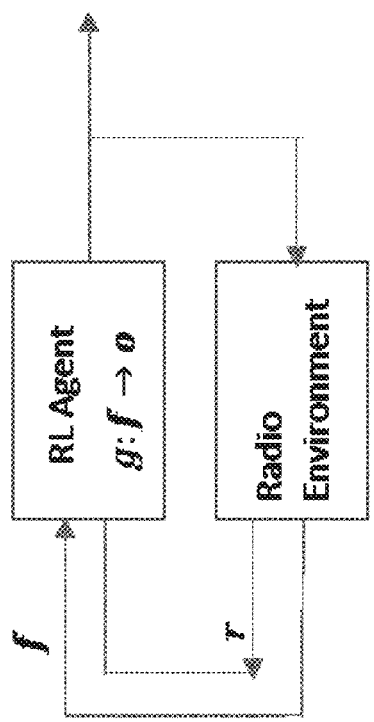
FIG. 5 illustrates exemplary reinforcement learning agent and its functioning according to the present disclosure.

An exemplary reinforcement learning (RL) agent and its general functioning is shown in FIG. 5. This agent learns a mapping function g: f→o, wherein f denotes the state of the environment (e.g., given by the TBS prediction and the observation prediction, as described above) and wherein o denotes the action to be taken in that state (e.g., representing the allocation of the corresponding size and number of the RLC PDU segments, as described above). In practical environments, such mapping may initially be unknown and may be learned by the agent by considering the long-term behavior of the radio environment, taking into account the rewards r attributed to respective state-action pairs and updating their values when exploring the environment. The mapping function g may act as a policy that decides on what actions are appropriate for a given state with the aim of maximizing the long-term outcome. To learn the mapping function g, the agent may try different actions in different states (i.e., through a trial and error process, as described above) and create a collection of state-action pairs with corresponding values being updated by positive rewards r favoring desired actions and by negative rewards r penalizing undesired actions, so that the reinforcement learning agent may improve the state-to-action mapping over time. When the state-to-action mapping is encoded using a deep neural network, the deep neural network may be used to generalize the mapping also for unknown states of the environment.

The aspect of penalizing undesired outputs of the allocation algorithm may also be applied when the allocation algorithm is implemented using a static allocation algorithm or using a machine learning agent which is trained based on a training data set, as described above. In these cases, potential error cases may be addressed in a validation phase regarding the prediction of the subcomponents as well as the output of the allocation algorithm. Performing error compensation may involve forcing appropriate penalties on critical cases, such as cases where the RLC PDUs are fragmented on the physical layer due to a prediction of larger expected TBSs than the actual ones, for example. Appropriate measures may be taken to compensate for these errors.

FIG. 6 illustrates a method which may be performed by the computing unit 210 according to the present disclosure. The method is dedicated to training a machine learning agent adapted to determine segmentation parameters for use in segmenting RLC PDUs in an RLC preprocessing procedure performed by a UE prior to receiving a UL grant for transmission of the RLC PDUs, wherein the segmentation parameters comprise a size of RLC PDU segments and a number of RLC PDU segments to be included into a physical layer TB.

In step S602, the computing unit 210 may train the machine learning agent using a training data set comprising TBS data and observation data as input data and corresponding sizes of RLC PDU segments and corresponding numbers of RLC PDU segments as output data, wherein the TBS data includes expected physical layer TBSs and the observation data includes at least one of expected channel qualities, expected traffic volumes and expected available bandwidths observable during transmission of RLC PDUs. The training data set may be selected so as to maximize, when the machine learning agent determines the size of RLC PDU segments and the number of RLC PDU segments based on a TBS prediction of an expected physical layer TBS and an observation prediction of at least one of an expected channel quality, an expected traffic volume and an expected available bandwidth observable during transmission of the RLC PDUs, the size of RLC PDU segments while keeping a total size of the number of RLC PDU segments within the expected TBS.

The method of FIG. 6 defines a method dedicated to train a machine learning agent which, once it is trained, may be employed for the purpose of determining the size of RLC PDU segments and the number of RLC PDU segments in accordance with the method described above in relation to FIG. 3. As such, aspects described above with regard to the machine learning agent may be applicable to the machine learning agent used in the method of FIG. 6 as well, and vice versa. Unnecessary repetitions are thus omitted.

As the method of FIG. 3 is dedicated to determining segmentation parameters for use in segmenting RLC PDUs in an RLC preprocessing procedure performed by a UE prior to receiving a UL grant, the method may be performed by the UE itself. In one variant, the computing unit 200 (executing the method of FIG. 3) may thus be the UE. The UE may be a cellular phone, a laptop, a connected industrial machine or a smart home appliance, for example. It will be understood, however, that, in other variants, the method may also be performed by a different entity, such as a node of a Radio Access Network (RAN) or a Core Network (CN) of the mobile communication system, for example, which may determine the suitable/optimized segmentation parameters and then provide the segmentation parameters to the UE which subsequently uses it for transmission of the RLC PDUs.

Similarly, it will be understood that the method of FIG. 6 may be performed by an entity different from the UE. The computing unit 210 (executing the method of FIG. 6) may be a node of a RAN or a CN of the mobile communication system, for example. Such entity may, once the machine learning agent is trained, provide the trained machine learning agent (e.g., a trained neural network) to the entity determining the segmentation parameters, which may then employ it for actually determining the suitable/optimized segmentation parameters, as described above.

If the computing unit 200 and the computing unit 210 are entities different from the UE, it will be understood that each of the computing unit 200 and the computing unit 210 may be implemented on a physical computing unit or a virtualized computing unit, such as a virtual machine, for example. It will further be appreciated that each of the computing unit 200 and the computing unit 210 may not necessarily be implemented on a standalone computing unit, but may be implemented as components—realized in software and/or hardware—residing on multiple distributed computing units as well, such as in a cloud computing environment, for example.

As has become apparent from the above, the present disclosure provides a technique for determining segmentation parameters for use in segmenting RLC PDUs in an RLC preprocessing procedure performed by a UE prior to receiving a UL grant for transmission of the RLC PDUs. Using the outputs of subsystems, e.g., including the prediction of future CSI, data volume arrival of each service, TBS, interference and PRBs, the size and number of RLC PDUs may be optimized for each service, wherein the inputs of the subsystems may be taken from various data, including application traffic, UE, layer, radio environment and actual environment based data. The presented technique may generally preserve the advantages of RLC preprocessing, i.e., enabling the RLC layer to preprocess the RLC PDUs ahead of UL grant reception time so that latency may be decreased. At the same time, the presented technique may enable performing the RLC preprocessing in a manner such that the RLC PDUs sizes are increased as much as possible, to thereby reduce overhead and increase spectral efficiency, while maintaining the overall size of the RLC PDUs within the UL grant's TBS to avoid data fragmentation. The presented technique may provide robustness against dynamicity and changes in the application layer traffic load and intensity, as well as against the use of different devices of different quality/capability during the training, testing and production phases. The latter may especially be achieved by the diversity of features that are used to train the agents.

With respect to systems of the prior art, the technique presented herein may additionally provide the following advantages. While prior art systems may focus on merely forecasting the physical layer TBS, the presented technique may rather be directed to predicting the size and number of RLC PDUs, to thereby leave freedom to applications to adapt RLC segmentation (and optionally change packet sizes) based on the load, conditions of the radio environment and the availability of preprocessing time, for example. Also, merely forecasting the physical layer TBS may not help to reduce both latency and overhead and may, more generally, not be enough to determine a generally suitable/optimized size and number of RLC PDUs because different applications may have different DRB requirements. This may be addressed by the presented technique through consideration of additional parameters, such as the observation prediction described above. Prior art systems may also fail to provide learning support with respect to the real-time environment and may not take into account the dynamicity of the radio requirement. The presented technique, on the other hand, may enable dynamically adapting to changes in the radio environment and its wireless channels by the use of (e.g., deep) reinforcement learning techniques, for example. Rather than merely providing forecasts using time series prediction regarding the TBS, the presented technique may thus support learning capabilities based on interactions with the real-time dynamic radio environment.

It is believed that the advantages of the technique presented herein will be fully understood from the foregoing description, and it will be apparent that various changes may be made in the form, constructions and arrangement of the exemplary aspects thereof without departing from the scope of the invention or without sacrificing all of its advantageous effects. Because the technique presented herein can be varied in many ways, it will be recognized that the invention should be limited only by the scope of the claims that follow.

The invention claimed is:

1. A method performed by a User Equipment (UE), the method comprising:
   determining a Transport Block Size (TBS) prediction of an expected physical layer TBS;
   determining an observation prediction of at least one of an expected channel quality, an expected traffic volume, and an expected available bandwidth observable during transmission of Radio Link Control (RLC) Protocol Data Units (PDUs) to be included into a physical layer transport block;
   determining, based on the TBS prediction and the observation prediction, segmentation parameters comprising a size of RLC PDU segments and a number of RLC PDU segments, wherein determining the segmentation parameters comprises maximizing the size of RLC PDU segments while keeping a total size of the number of RLC PDU segments within the expected physical layer TBS; and
   segmenting the RLC PDUs in an RLC preprocessing procedure prior to receiving an uplink grant for transmission of the RLC PDUs and in accordance with the size of RLC PDU segments and the number of RLC PDU segments.

2. The method of claim 1, wherein determining the size of RLC PDU segments and the number of RLC PDU segments is performed using a static allocation algorithm adapted to maximize a weighted sum of a payload to overhead ratio regarding RLC PDU segments and a number of RLC PDU segments.

3. The method of claim 1, wherein determining the size of RLC PDU segments and the number of RLC PDU segments is performed using a machine learning agent which is trained using a training data set comprising TBS data and observation data as input data and corresponding sizes of RLC PDU segments and corresponding numbers of RLC PDU segments as output data.

4. The method of claim 1, wherein:
   determining the size of RLC PDU segments and the number of RLC PDU segments is performed using a reinforcement learning agent;
   a state of an environment is defined by the TBS prediction and the observation prediction; and
   an action taken by the reinforcement learning agent from a given state corresponds to an allocation of a number of RLC PDU segments with a particular size.

5. The method of claim 4, further comprising attributing a reward to the action taken by the reinforcement learning agent from the given state, the reward being either a positive reward or a negative reward based respectively on whether or not a total size of the allocated number of RLC PDU segments is within the expected physical layer TBS, wherein an amount of the positive reward is calculated in accordance with the size of the allocated RLC PDU segments.

6. The method of claim 1, further comprising determining an interference prediction of an expected interference caused by at least one of other cells and other UEs, wherein the TBS prediction is determined based on the interference prediction.

7. The method of claim 6, wherein at least one of the TBS prediction, the interference prediction and the observation prediction is determined based on input data comprising at least one of:
   application traffic data regarding at least one of packet sizes, uplink/downlink packet numbers, inter-packet arrival times, times since last packets, and application protocols;
   UE data regarding at least one of UE capabilities, UE device types, UE manufacturers, and UE 3GPP feature types;
   protocol layer data regarding at least one of Logical Channel Identities (LCH-IDs), Buffer Status Reports (BSRs), and TBSs;
   radio transmission data regarding at least one of Channel State Information (CSI), Physical Resource Blocks (PRBs), and Modulation and Coding Schemes (MCSs); and
   environment data regarding at least one of weather conditions and architectural information of a building.

8. The method of claim 1, wherein the expected channel quality is indicated by CSI.

9. The method of claim 1, wherein the expected traffic volume corresponds to traffic volume on a Data Radio Bearer (DRB).

10. The method of claim 1, wherein a plurality of DRBs is established and the prediction of the expected traffic volume is determined per DRB among the plurality of DRBs.

11. The method of claim 10, wherein the size of RLC PDU segments and the number of RLC PDU segments are determined per DRB of the plurality of DRBs.

12. The method of claim 1, wherein the expected available bandwidth corresponds to a bandwidth of PRBs allocated to a given UE.

13. The method of claim 1, further comprising training a machine learning agent configured to determine the segmentation parameters such that the size of RLC PDU segments are maximized while keeping the total size of the number of RLC PDU segments within the expected physical layer TBS, the training comprising using a training data set comprising TBS data and observation data as input data and corresponding RLC PDU segment sizes and corresponding numbers of RLC PDU segments as output data, the observation data including at least one of channel qualities, traffic volumes, and available bandwidths observed in past transmissions of RLC PDUs.

14. A User Equipment (UE) comprising:
   processing circuitry and memory, the processing circuitry being configured to execute software instructions stored in the memory whereby the UE is configured to:
      determine a Transport Block Size (TBS) prediction of an expected physical layer TBS;
      determine an observation prediction of at least one of an expected channel quality, an expected traffic volume, and an expected available bandwidth observable during transmission of Radio Link Control (RLC) Protocol Data Units (PDUs) to be included into a physical layer transport block;
      determine, based on the TBS prediction and the observation prediction, segmentation parameters comprising a size of RLC PDU segments and a number of RLC PDU segments, wherein to determine the segmentation parameters the processing circuitry is configured to maximize the size of RLC PDU segments while keeping a total size of the number of RLC PDU segments within the expected physical layer TBS; and
      segment the RLC PDUs in an RLC preprocessing procedure prior to receiving an uplink grant for transmission of the RLC PDUs and in accordance with the size of RLC PDU segments and the number of RLC PDU segments.

15. The UE of claim 14, wherein to determine the size of RLC PDU segments and the number of RLC PDU segments the UE is configured to use a static allocation algorithm adapted to maximize a weighted sum of a payload to overhead ratio regarding RLC PDU segments and a number of RLC PDU segments.

16. The UE of claim 14, wherein:
   to determine the size of RLC PDU segments and the number of RLC PDU segments the UE is configured to use a reinforcement learning agent;
   a state of an environment is defined by the TBS prediction and the observation prediction; and
   an action taken by the reinforcement learning agent from a given state corresponds to an allocation of a number of RLC PDU segments with a particular size.

17. The UE of claim 16, wherein:
   the UE is further configured to attribute a reward to the action taken by the reinforcement learning agent from the given state;
   the reward is either a positive reward or a negative reward based respectively on whether or not a total size of the allocated number of RLC PDU segments is within the expected physical layer TBS; and
   an amount of the positive reward is calculated in accordance with the size of the allocated RLC PDU segments.

18. The UE of claim 14, wherein the UE is further configured to determine an interference prediction of an expected interference caused by at least one of other cells and other UEs, wherein the TBS prediction is determined based on the interference prediction.

19. The UE of claim 14, wherein:
   to determine the segmentation parameters such that the size of RLC PDU segments are maximized while keeping the total size of the number of RLC PDU segments within the expected physical layer TBS, the UE is further configured to train a machine learning agent that determines the segmentation parameters;
   to train the machine learning agent, the UE is configured to use a training data set comprising TBS data and observation data as input data and corresponding RLC PDU segment sizes and corresponding numbers of RLC PDU segments as output data; and
   the observation data comprises at least one of channel qualities, traffic volumes, and available bandwidths observed in past transmissions of RLC PDUs.

20. A non-transitory computer readable medium storing a computer program product for controlling a User Equipment (UE), the computer program product comprising software instructions that, when run on the UE, cause the UE to:
   determine a Transport Block Size (TBS) prediction of an expected physical layer TBS;

determine an observation prediction of at least one of an expected channel quality, an expected traffic volume, and an expected available bandwidth observable during transmission of Radio Link Control (RLC) Protocol Data Units (PDUs) to be included into a physical layer transport block;

determine, based on the TBS prediction and the observation prediction, segmentation parameters comprising a size of RLC PDU segments and a number of RLC PDU segments, wherein determining the segmentation parameters comprises maximizing the size of RLC PDU segments while keeping a total size of the number of RLC PDU segments within the expected physical layer TBS; and segment the RLC PDUs in an RLC preprocessing procedure prior to receiving an uplink grant for transmission of the RLC PDUs and in accordance with the size of RLC PDU segments and the number of RLC PDU segments.

* * * * *